United States Patent [19]
Gallus et al.

[11] Patent Number: 5,931,579
[45] Date of Patent: Aug. 3, 1999

[54] MIXER-REACTOR AND PROCESS FOR CONTAINING NOZZLES FOR CARRYING OUT THE PHOSGENATION OF PRIMARY AMINES

[75] Inventors: Manfred Gallus, Krefeld; Harald Müller, Dormagen; Bernd Weber, Krefeld, all of Germany

[73] Assignee: Bayer Aktiengesellschaft, Leverkusen, Germany

[21] Appl. No.: 08/927,169

[22] Filed: Sep. 11, 1997

[30] Foreign Application Priority Data

Sep. 20, 1996 [DE] Germany ............... 196 38 567

[51] Int. Cl.⁶ ....................................... B01F 5/04
[52] U.S. Cl. .................. 366/163.2; 366/172.1; 366/178.2; 366/304; 422/225
[58] Field of Search ............. 366/163.2, 162.4, 366/162.5, 167.1, 168.1, 172.1, 172.2, 182.1, 173.1, 176.1, 176.2, 178.1, 178.2, 178.3, 181.6, 303, 304; 422/134, 135, 224, 225

[56] References Cited

U.S. PATENT DOCUMENTS

| | | |
|---|---|---|
| 2,389,486 | 11/1945 | Colony . |
| 4,086,663 | 4/1978 | Croft ............................. 366/181.6 |
| 4,123,800 | 10/1978 | Mazzei ........................... 366/181.6 |
| 4,691,867 | 9/1987 | Iwako et al. . |
| 4,851,571 | 7/1989 | Sauer et al. . |
| 4,915,509 | 4/1990 | Sauer et al. . |
| 5,117,048 | 5/1992 | Zaby et al. . |
| 5,660,466 | 8/1997 | Hopson et al. ................. 366/178.2 |

FOREIGN PATENT DOCUMENTS

| | | | |
|---|---|---|---|
| 59-183820 | 10/1984 | Japan ........................... 366/178.3 |
| 438432 | 8/1974 | U.S.S.R. ....................... 366/176.2 |
| 1013888 | 12/1965 | United Kingdom . |
| 96/16028 | 5/1996 | WIPO . |

*Primary Examiner*—Charles E. Cooley
*Attorney, Agent, or Firm*—Joseph C. Gil; Noland J. Cheung

[57] ABSTRACT

A mixer-reactor for mixing at least two fluid substances and carrying out or initiating a reaction between them, wherein the mixer-reactor consists of a substantially rotationally symmetrical casing containing a mixing chamber having separate inlets for the at least two substances and an outlet, the inlet for the at least first substance being provided within the axis of the mixing chamber and the inlet for the at least second substance being constructed in the form of a plurality of nozzles arranged rotationally symmetrically to the axis of the mixing chamber, characterized in that a bolt which is displaceable in the direction of the nozzle axis is allocated to each nozzle, wherein the bolt is acting to remove the caking or clogging material from the nozzle.

6 Claims, 3 Drawing Sheets

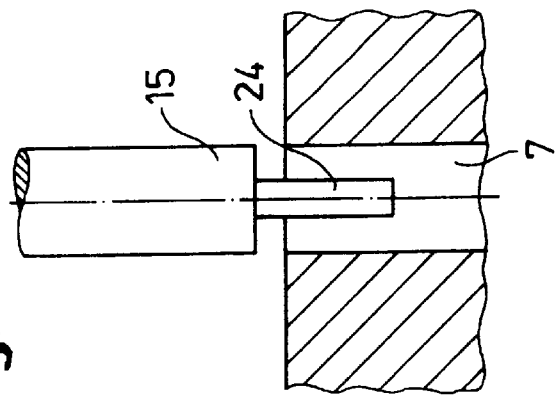
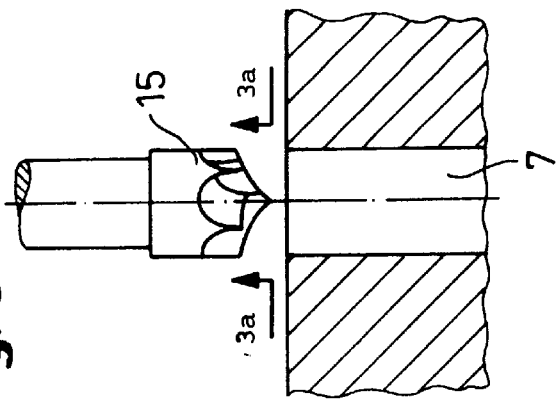
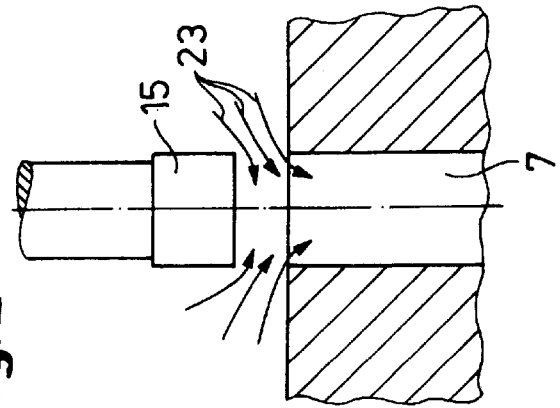

MIXER-REACTOR AND PROCESS FOR CONTAINING NOZZLES FOR CARRYING OUT THE PHOSGENATION OF PRIMARY AMINES

FIELD OF THE INVENTION

This invention relates to a mixer-reactor for mixing at least two fluid substances and carrying out or initiating a reaction between them, in particular for the preparation of mono- or polyisocyanates by reacting the mono- or polyamines corresponding to the mono- or polyisocyanates with phosgene dissolved in an organic solvent.

BACKGROUND OF THE INVENTION

It is known that rapidly initiated reactions of this type may be carried out in a mixer-reactor consisting of a substantially rotationally symmetrical casing. The casing contains a substantially rotationally symmetrical mixing chamber having separate inlets for at least two substances and an outlet. The inlet for the at least first substance is provided within the axis of the mixing chamber and the inlet for the at least second substance is constructed in the form of a plurality of nozzles arranged rotationally symmetrically to the axis of the mixing chamber; see, for example, U.S. Pat. Nos. 4,851,571, 4,915,509 and 5,117,048.

The quality of the products prepared in apparatus of this type depends very greatly on the quality and rate of mixing of the fluid substances. Here, the injection of even flows of material through each of the nozzles into the mixing chamber is of crucial importance.

A disadvantage of the known mixer-reactors is that, in the course of time, caking and subsequent clogging occur inside the nozzles, resulting in the disturbance of the injection of equal flows of material through all the nozzles. Therefore, high demands with regard to freedom from solids and from reactive foreign substances have to be imposed, at least on the second substance. There is an increased risk of clogging, particularly where the second substance is dissolved or suspended in a solvent or in a suspending medium and the solvent or suspending medium is separated from the product and reused. To lower the tendency of caking and clogging, it is necessary to carry out an extensive purification process for the solvent or suspending medium to be reused, in order to lower the tendency to clogging. Caking may also occur on the nozzles on the entry side to the mixer as a result of secondary reactions with the first substance. Where caking and/or clogging occur, the continuous process has to be interrupted and the mixer-reactor taken apart and cleaned. This causes considerable idle periods. Where hazardous substances are used, as in the case of phosgene, industrial hygiene regulations necessitate expensive measures during the disassembly of the mixer-reactor, such as the thorough rinsing of the reactor before disassembly, protective clothing, exhaustion of the atmosphere, breathing apparatus, and etc.

SUMMARY OF THE INVENTION

The present invention provides for a mixer-reactor for mixing and carrying out or initiating a reaction between at least a first and second fluid substance, wherein said mixer-reactor consists of a substantially rotationally symmetrical casing containing a mixing chamber having an outlet and respective separate inlets for each of said first and second fluid substances, said first inlet for said first fluid substance being provided within the axis of the mixing chamber and said second inlet for said at least second substance being constructed in the form of a plurality of nozzles arranged rotationally symmetrically to the axis of said mixing chamber, characterized in that a bolt which is displaceable in the direction of the axis of said nozzle is allocated to each said nozzle.

BRIEF DESCRIPTION OF THE DRAWINGS

FIG. 2 shows an enlarged and alternative representation of the detail A shown in FIG. 1.

FIG. 3 shows another enlarged and alternative representation of the detail A shown in FIG. 1.

FIG. 3a shows a cross sectional view taken along line 3a—3a of the front of the bolt shown in FIG. 3.

FIG. 4 shows another enlarged and alternative representation of the detail A shown in FIG. 1.

DETAILED DESCRIPTION OF THE INVENTION

Figure 1:
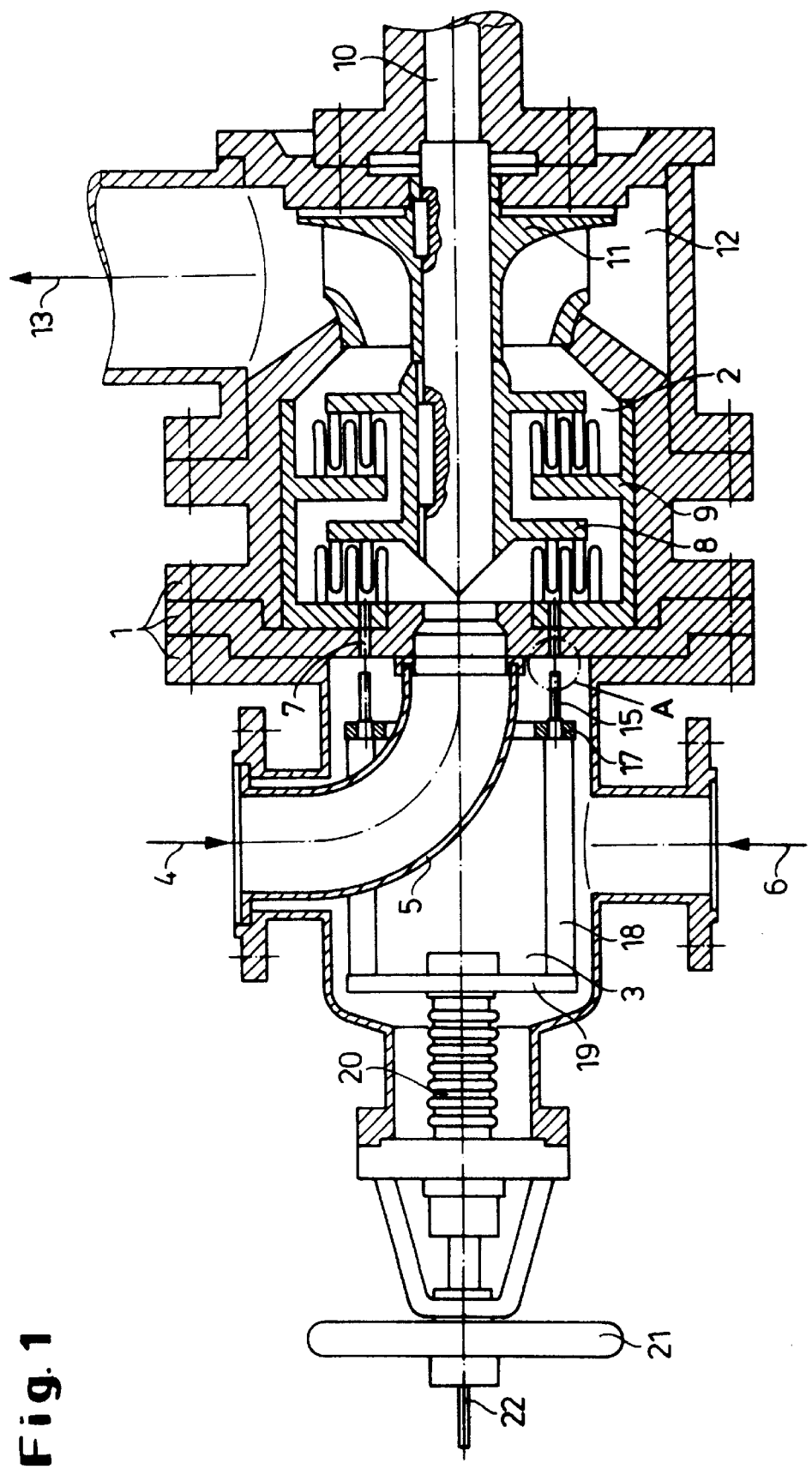
FIG. 1 shows a mixer-reactor according to the present invention, the mixing unit being represented by a rotary mixer.

The bolts are preferably arranged inside a distribution chamber positioned in front of the mixing chamber, into which the at least second substance is introduced into the distribution chamber and wherein this substance is distributed to the plurality of nozzles.

If there is a build-up of caking and/or clogging in the nozzles, which is detectable by a pressure increase in the inlet for the at least second substance, the nozzles are penetrated by axial displacement of the bolts and caking or clogging material is removed.

Through the use of the mixer-reactor according to the present invention, the non-productive time for the cleaning of the nozzles is consequently reduced to a few seconds.

The nozzles are generally constructed in the form of bores which are arranged concentrically around the axis of the mixing chamber and pass through the separating wall between the distribution chamber and the mixing chamber. The number of nozzles may be from 6 to 32. The diameter of the nozzles is typically between 1 and 10 mm. The longitudinal extension and the minimal possible travel of the bolts exceeds the longitudinal extension of the bores of the nozzles.

During the operation of the mixer-reactor according to the present invention, the bolt reveals the nozzle entry. During the operation, the end of the bolt is preferably at a distance from the entry to the nozzle such that the inflow of fluid substance is choked into the nozzle. The resulting turbulence lowers the risk of formation of caking in the nozzle.

In another preferred embodiment of the present invention, the front end of the bolt can be shaped so that a rotating inflow is produced.

The mixing chamber can be constructed in the form of a Venturi tube, with the nozzles for the introduction of the at least second substance leading into the mixing chamber substantially radially at the narrowest part of the Venturi tube. A mixing chamber of this type is disclosed in U.S. Pat. No. 5,117,048.

In another embodiment of the present invention, the mixing chamber is constructed in the form of a rotary mixer having rotor mixing elements and stator mixing elements. Mixer-reactors of this type are known, for example, from U.S. Pat. No. 4,915,509 and GB-A 2,169,814. A rotor disc, which assists the removal of the mixed and optionally reacted flow, can be provided on the rotor axle connected to the actual mixing chamber.

In the case of a rotary mixer, the nozzles are preferably arranged on the front face of the mixer parallel to the mixer axis. In this case, the bolts are preferably attached to a common supporting ring, which is displaceable on an axis running through the casing of the distribution chamber. The passage through the axis is preferably encapsulated so as to be gas-tight, for example, by welded expansion bellows.

The mixer-reactor according to the present invention is particularly suitable as a prephosgenation reactor for the preparation of isocyanates. In this embodiment of the reactor, wherein two substances are present, phosgene dissolved in an organic solvent is used as a first substance and primary amine, optionally dissolved in a solvent, is used as a second substance. With respect to the particulars of the initial substances used and reaction conditions, reference is made to U.S. Pat. Nos. 4,851,571 and 5,117,048 and WO 96/16 028. Isocyanate may also be used as solvent for the phosgene (WO 96/16 028).

In an embodiment of the present invention, wherein two flows or substances are present, the mixer-reactor, which is represented as an axial section in FIG. 1, consists of a casing 1, which contains a mixing chamber 2 and a distribution chamber 3. The first material flow 4 is introduced axially into the mixing chamber 2 through a bent duct 5 which passes laterally into the wall of the distribution chamber. The second material flow 6 is introduced into the distribution chamber 3 and enters the mixing chamber 2 through a plurality of parallel nozzle bores 7 concentric to the axis of the mixer-reactor. The mixing chamber 2 contains rotor elements 8 driven on an axis 10 and stator elements 9 connected to the casing. A rotor disc 11 is also provided, which conveys the mixture through the annular channel 12 into the outlet duct 13. According to the present invention, bolts 15 are provided, which are allocated to each nozzle 7 and attached to a supporting ring 17. The supporting ring 17 is connected via a spacer block 18 to a plate 19, which is axially displaceable on an axis 22 by means of a handwheel 21. The passage of the axis 22 through the wall of the distribution chamber 3 is encapsulated so as to be gas-tight, for example, by welded expansion bellows 20.

FIG. 2 shows an enlarged representation of the detail A in FIG. 1, with the distance of the front end of the bolt 15 from the inlet into the nozzle 7 being selected so that a choking of the inflow occurs. The inflow is indicated by the arrows 23.

FIG. 3 shows an alternative enlarged representation of the detail A in FIG. 1, with the front end of the bolt 15 being shaped in such a way that a rotating inflow is produced.

FIG. 3a shows a cross-sectional view of the front end of the bolt 15.

FIG. 4 shows a bolt 15 with an attachment 24 which constricts the cross-sectional area of the inflow into the nozzle 7.

Figure 5:
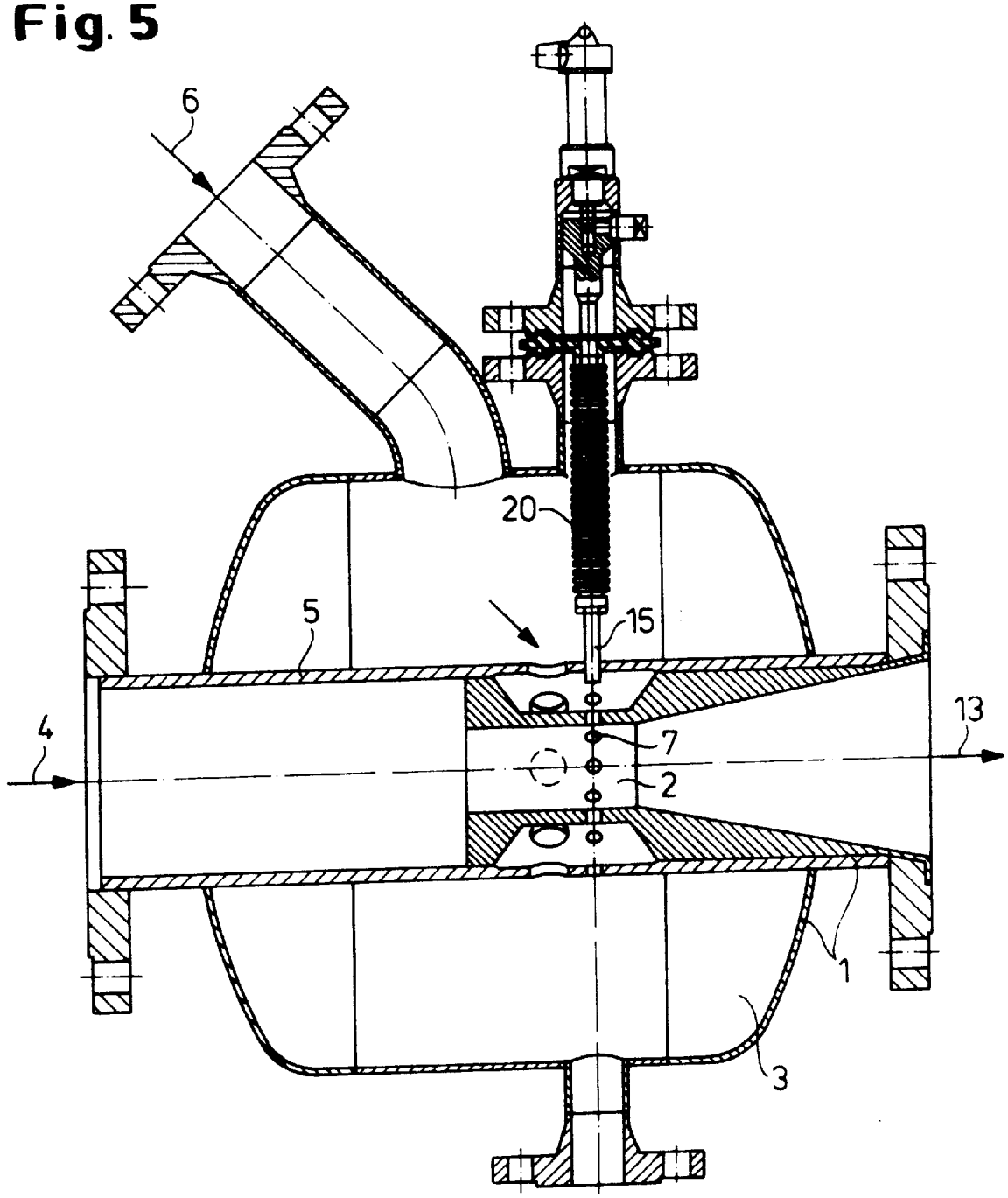
FIG. 5 shows a mixer-reactor according to the present invention, the mixing unit being represented by a Venturi tube.

FIG. 5 shows the axial section through the mixer-reactor according to the invention, with the mixing chamber 2 being constructed in the form of a Venturi tube. The distribution chamber 3 is arranged concentrically around the mixing chamber 2. The nozzles 7 run radially into the mixing chamber 2. Corresponding with this, the bolts 15 are individually radially displaceable into and out of each nozzle 7 along a path sealed by bellows 20. The elements corresponding to those shown in FIG. 1 are indicated by the same reference numbers.

Although the present invention has been described in detail in the foregoing for the purpose of illustration, it is to be understood that such detail is solely for that purpose and that variations can be made therein by those skilled in the art without departing from the spirit and scope of the invention except as it may be limited by the claims.

what is claimed is:

1. A mixer-reactor for mixing a plurality of fluid substances having at least a first and second fluid substance and carrying out or initiating a reaction between each said fluid substance, wherein said mixer-reactor consists of a substantially rotationally symmetrical casing containing a mixing chamber having an outlet and respective separate inlets for each of said plurality of fluid substances, said first inlet for said first fluid substance being provided along an axis of the mixing chamber and said second inlet for said second fluid substance being constructed in the form of a plurality of nozzles arranged rotationally symmetrically to the axis of said mixing chamber, characterized in that a bolt which is displaceable in the direction of an axis of said nozzle is allocated to each said nozzle; said casing contains a distribution chamber positioned in front of said mixing chamber, wherein said distribution chamber contains said second inlet for said second fluid substance and each said bolt can be moved from said distribution chamber into each said nozzle; said mixing chamber is constructed in the form of a Venturi tube having a narrow section and each said plurality of nozzles for the introduction of said second fluid substance lead into said mixing chamber substantially radially at said narrow section of said Venturi tube.

2. A mixer-reactor for mixing a plurality of fluid substances having at least a first and second fluid substance and carrying out or initiating a reaction between each said fluid substance, wherein said mixer-reactor consists of a substantially rotationally symmetrical casing containing a mixing chamber having an outlet and respective separate inlets for each of said plurality of fluid substances, said first inlet for said first fluid substance being provided along an axis of the mixing chamber and said second inlet for said second fluid substance being constructed in the form of a plurality of nozzles arranged rotationally symmetrically to the axis of said mixing chamber, characterized in that a bolt which is displaceable in the direction of an axis of said nozzle is allocated to each said nozzle, said casing contains a distribution chamber positioned in front of said mixing chamber, wherein said distribution chamber contains said second inlet for said second fluid substance and each said bolt can be moved from said distribution chamber into each said nozzle; wherein said mixing chamber is constructed in the form of a rotary mixer having rotor mixing elements and stator mixing elements.

3. A mixer-reactor according to claim 2, wherein each of said nozzles lead into said mixing chamber parallel to the axis thereof and each said bolt is attached to a supporting ring arranged in said distribution chamber, so that said bolts are jointly displaceable parallel to the axis of said mixing chamber.

4. A mixer-reactor according to claim 2, wherein said mixing chamber contains a rotor disc positioned in front of said outlet.

5. A process for carrying out reactions of a plurality of two fluid substances, utilizing a mixer reactor as a first reaction step for mixing, wherein said mixer-reactor consists of a substantially rotationally symmetrical casing containing a mixing chamber having an outlet and respective separate inlets for each of said plurality of fluid substances, said first inlet for said first fluid substance being provided along an axis of the mixing chamber and said second inlet for said second fluid substance being constructed in the form of a plurality of nozzles arranged rotationally symmetrically to the axis of said mixing chamber, characterized in that a bolt which is displaceable in the direction of an axis of said nozzle is allocated to each said nozzle and periodically, or in the event of a pressure increase in said second inlet for said second fluid substance, penetrating said plurality of nozzles with each said bolt; wherein said second fluid substance is introduced by means of a solvent or suspending medium, said solvent or suspending medium being recirculated after the reaction product is separated.

6. A process according to claim 5, wherein phosgene is dissolved in a solvent and is used as said first fluid substance and a primary amine is used as said second fluid substance.

* * * * *